US011976932B2

(12) United States Patent
Andrew et al.

(10) Patent No.: US 11,976,932 B2
(45) Date of Patent: *May 7, 2024

(54) GUIDANCE AUDIO CUES FOR NAVIGATION ASSISTANCE

(71) Applicant: MICROSOFT TECHNOLOGY LICENSING, LLC, Redmond, WA (US)

(72) Inventors: Felix Gerard Torquil Ifor Andrew, Seattle, WA (US); Geoffrey T. Ebersol, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 151 days.

This patent is subject to a terminal disclaimer.

(21) Appl. No.: 17/517,831

(22) Filed: Nov. 3, 2021

(65) Prior Publication Data

US 2022/0187094 A1   Jun. 16, 2022

Related U.S. Application Data

(63) Continuation of application No. 15/478,483, filed on Apr. 4, 2017, now Pat. No. 11,193,783.

(51) Int. Cl.
*G01C 21/36*   (2006.01)
*G01C 21/20*   (2006.01)

(52) U.S. Cl.
CPC ......... *G01C 21/3629* (2013.01); *G01C 21/20* (2013.01); *G01C 21/367* (2013.01); *G01C 21/3679* (2013.01); *G01C 21/3655* (2013.01)

(58) Field of Classification Search
CPC .. G01C 21/3629; G01C 21/20; G01C 21/367; G01C 21/3679; G01C 21/3655
See application file for complete search history.

(56) References Cited

U.S. PATENT DOCUMENTS 6,339,746 B1   1/2002   Sugiyama et al.
9,195,290 B2   11/2015  Siliski et al.
(Continued)

FOREIGN PATENT DOCUMENTS

WO   2004113841 A1   12/2004
WO   2016069671 A1   5/2016

OTHER PUBLICATIONS

Jones, et al., "Navigation-by-Music for Pedestrians: an Initial Prototype and Evaluation", In Proceedings of International Symposium on Intelligent Environments, Apr. 5, 2006, pp. 95-101.
(Continued)

*Primary Examiner* — Ian Jen
*Assistant Examiner* — Renee LaRose
(74) *Attorney, Agent, or Firm* — Newport IP, LLC; Jacob P. Rohwer

(57) ABSTRACT

In device-assisted navigation, audio navigation cues are often presented at particular locations along a route (e.g., "in 200 meters, turn left" and "turn left here"). However, if the user stops, navigation cues also stop since the user's position is not changing. Additionally, the navigation instruction at the next navigation point may be conflated with the actual position of the next navigation point; e.g., an instruction to "turn left" may be confusing if the road takes a sharp right turn immediately before the next navigation point. Instead, the device may periodically compare the current position of the user and the next navigation point, and periodically present guidance audio cues that indicate the distance and heading offset to the next navigation point. Guidance audio cues may be integrated with and/or supplemented by audio navigation instructions to indicate both the location of the next navigation point and instructions to be followed there.

19 Claims, 8 Drawing Sheets

(56) References Cited

U.S. PATENT DOCUMENTS

| | | | |
|---|---|---|---|
| 2006/0247849 A1 | 11/2006 | Mohsini et al. | |
| 2008/0215239 A1* | 9/2008 | Lee | G01C 21/3629 |
| | | | 701/441 |
| 2012/0022777 A1* | 1/2012 | James | G01C 21/343 |
| | | | 701/438 |
| 2016/0123745 A1* | 5/2016 | Cotier | G08G 1/005 |
| | | | 701/467 |
| 2016/0259027 A1* | 9/2016 | Said | H04W 4/029 |
| 2018/0012118 A1* | 1/2018 | Catten | G06N 3/006 |

OTHER PUBLICATIONS

Pielot, et al., "PocketNavigator: Vibro-Tactile Waypoint Navigation for Everyday Mobile Devices", In Proceedings of the 12th International Conference on Human Computer Interaction with Mobile Devices and Services, Sep. 7, 2010, pp. 423-426.

Robinson, et al., "I Did it my Way": Moving Away from the Tyranny of Turn-by-Turn Pedestrian Navigation, In Proceedings of the 12th International Conference on Human Computer Interaction with Mobile Devices and Services, Sep. 7, 2010, pp. 341-344.

Robinson, et al., "Navigation your way: From Spontaneous Independent Exploration to Dynamic Social Journeys", In Journal of Personal and Ubiquitous Computing, vol. 16, Issue 8, Sep. 20, 2011, pp. 973-985.

Walker, et al., "Auditory Navigation Performance is Affected by Waypoint Capture Radius", In Proceedings of the Tenth International Conference on Auditory Display, Jul. 6, 2004, 6 Pages.

* cited by examiner

US 11,976,932 B2

GUIDANCE AUDIO CUES FOR NAVIGATION ASSISTANCE

CROSS-REFERENCE TO RELATED APPLICATION

This application is a continuation of U.S. patent application Ser. No. 15/478,483, filed Apr. 4, 2017, the content of which application is hereby expressly incorporated herein by reference in its entirety.

BACKGROUND

Within the field of navigation, many scenarios involve the presentation of navigation instructions that provide navigation assistance to the user. For example, a mapping application may receive from the user a selection of a destination; plan a route from the current position of the user to the destination, where the route includes a number of navigation instructions at specific locations, such as turning left at a particular street; and present audio instructions that describe the navigation instructions when the user is close to the location. The navigation audio instructions are often presented by a device of the user that is generally configured to play audio, such as an audio system of a vehicle that plays music and radio stations in addition to audio instructions provided by a navigation device, and a headset that receives instructions from a mobile device for integration with other audio sources that the user is currently consuming. The navigation audio instructions may also be supplemented with notifications in other modalities, such as a visual indication of the direction presented on the display of a mobile device, or haptic input provided by a wrist-mounted device that assists in conveying information to the user about the navigation instructions. The navigation audio instructions can also be adapted to adjust to the current circumstances of the user, such as adapting the route if the user changes to a new destination, or if the user fails or chooses not to follow a particular instruction and ends up in an unexpected location.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In the traditional presentation of audio instructions for navigation assistance described above, the route of the user is divided into a series of navigation points at which the user is to be instructed to follow a particular navigation instruction, such as turning left or taking a particular exit. The current position of the user is monitored, such as using a global positioning system (GPS) receiver or a triangulation device, and when the current position is detected within a proximity of the navigation point, the navigation audio instruction for the navigation is presented. One or more supplemental instructions may be presented at specific points leading up to the navigation point, such as a first supplemental instruction that informs the user of the distance to the next navigation point (e.g., upon turning onto a road, the user may be instructed to "follow this road for 10 kilometers"), and a second supplemental instruction presented at a point near the navigation point (e.g.: "Prepare to turn left in 200 meters"). Finally, if the user is generally detected as diverging from the route, a navigation audio instruction may be presented that provides remediation instructions to the (e.g.: "Return to the route").

However, in each such instance, the navigation audio instruction is tied to a particular location and/or condition upon which the navigation audio instruction is to be presented. Such presentation of navigation audio instruction may exhibit some deficiencies that cause confusion and/or an incomplete presentation of instructions.

As a first such example, the presentation of navigation audio instruction at particular locations may fail to guide the user between such locations. For instance, when the user is navigating along a 10-kilometer span of road, the device may present instructions at a few locations that indicate the distance to the navigation point (e.g., "follow this road for 10 kilometers") and another instruction that indicates the arrival at the navigation location, but between these locations, no audio assistance is presented. At these times, the user may be uncertain whether the user remains on course, the distance to the next navigation point, and indeed whether the device is continuing to track the current position and to present audio instructions. This is particularly the case when the user stops, e.g., due to traffic: while the current position of the user is not changing, no navigation audio instruction are presented that maintain the user's knowledge and/or confidence that the user is still following the route.

As a second such example, if the user receives only low-granularity instructions about the distance to the next navigation point, such presentation may be chronologically inconsistent if the speed of the user changes. For instance, the user start traveling along an 8-kilometer span of road, and may receive navigation audio instruction that update the user as to the distance to the next navigation point every two kilometers. However, if the user travels fast for two kilometers, slowly for two kilometers, and then fast again for two kilometers, the period between the second notification and the third notification will be much longer than the period between the other notifications. That is, if the user initiates this travel at 12:00 pm, the first notification is presented at 12:02 pm upon completing the first two-kilometer span; the second notification is presented at 12:08 pm upon completing the second two-kilometer span; and the third notification is presented at 12:10 pm upon completing the third two-kilometer span. The inconsistent timing of such instructions, due to presentation at specific locations which may vary due to the user's speed, may create periods when the user is not receiving instructions and is no longer confident of remaining on the path or the remaining distance to the next navigation point.

As a third such example, the navigation instruction to be presented to the user at a particular navigation point may sometimes vary significantly from the actual location of the navigation point itself. For example, the route may require the user to turn left at a particular intersection, and the navigation audio instructions may indicate as such (e.g.: "in 100 meters, prepare to turn left" and "turn left onto Main Street"). However, the road upon which the user is currently traveling may turn sharply to the right before the intersection, leaving the user surprised and/or confused by the instruction to turn left at the navigation point when the road turns sharply to the right. The user may either fail to follow the instruction correctly (e.g., turning left before the sharp right turn instead of after), may follow the instruction correctly while experiencing confusion or uncertainty as to the correctness of the user's choices, and/or may presume that the device is malfunctioning or disoriented. Such problems arise due to the conflation of two distinct pieces of information: the navigation instruction to be presented at a navigation point, and the actual location of the navigation point itself.

As a fourth such example, the audio navigation instruction may be overly tied to the route, without adequately adapting to the user's current circumstances. For example, a pedestrian may arrive at an intersection of two or more streets, and the audio navigation assistance may indicate the name of the street that the user is to follow (e.g., "turn onto Main Street") and/or the direction relative to the user's previous travel upon arriving at the intersection (e.g., "turn left"). However, the user may not know the names of the streets and/or may be unable to identify the streets by sight, and may therefore be unable to follow the instruction. In some cases, the intersection may present several options that nominally meet the navigation instruction (e.g., three streets that nominally appear to turn left), and following the instruction to "turn left" may be difficult. Furthermore, in some instances, the user may be disoriented upon arriving at a particular intersection (e.g., the user may be interrupted or distracted, or may not correctly identify the street by which the user arrived at the intersection), and may therefore incorrectly apply the relative direction to "turn left." These disadvantages may arise because the navigation audio instruction are generated based on the route and the user's past travel and present position, but are not adequately adapted to the user's current guidance needs to maintain consistency with the navigation instructions and the route.

Presented herein are techniques for presenting audio cues that guide a user along a route. In accordance with these techniques, the device may identify a route of the user from a current position to a destination, and a set of navigation points along the route at which navigation instructions are to be presented to the user. The device may periodically compare a current position of the user with the next navigation point to determine a distance to the next navigation point, and also a heading offset between the current position of the user and the navigation point. The device may periodically present, through the audio device, a guidance audio cue that indicates the heading offset and the distance to the next navigation point.

As one example, the audio device may periodically play an audio tone, where the periodicity of the tone indicates the distance to the next navigation point. For example, while the navigation point is still more than a selected distance away from the current position of the user, the tone may be played once every 60 seconds; and when the user approaches the navigation point, the tone may be presented more frequently, such as once every five seconds when the navigation point is imminent. Additionally, the device may feature audiospatial output, such as stereo speakers that are capable of playing left and right tones. The volume of the tone presented through the left vs. right speakers may be adapted to indicate the heading offset between the user's current heading and the next navigation point; e.g., the tone may be presented strongly through the right speaker to indicate that the next navigation point is approaching on the right, and through the left speaker to indicate that the next navigation point is approaching on the left. Such guidance audio cues may be integrated with a navigation audio instruction to be followed at the route (e.g., the tone of the guidance audio cue may sweep upward to indicate a right turn at the next navigation point, or sweet downward to indicate a left turn at the next navigation point), and/or may be supplemental with navigation audio instructions (e.g., guidance audio tones may be used to indicate the relationship between the user's current position and the next navigation point, and verbal instructions may convey the navigation instruction to be followed at that next navigation point). By presenting guidance audio cues that indicate the distance and heading offset between the current position and the next navigation point, and with a periodicity that maintains the user's confidence in following the route according to the navigation device, the techniques presented herein may address various limitations in the conventional presentation of audio instructions in the field of audio-assisted navigation.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
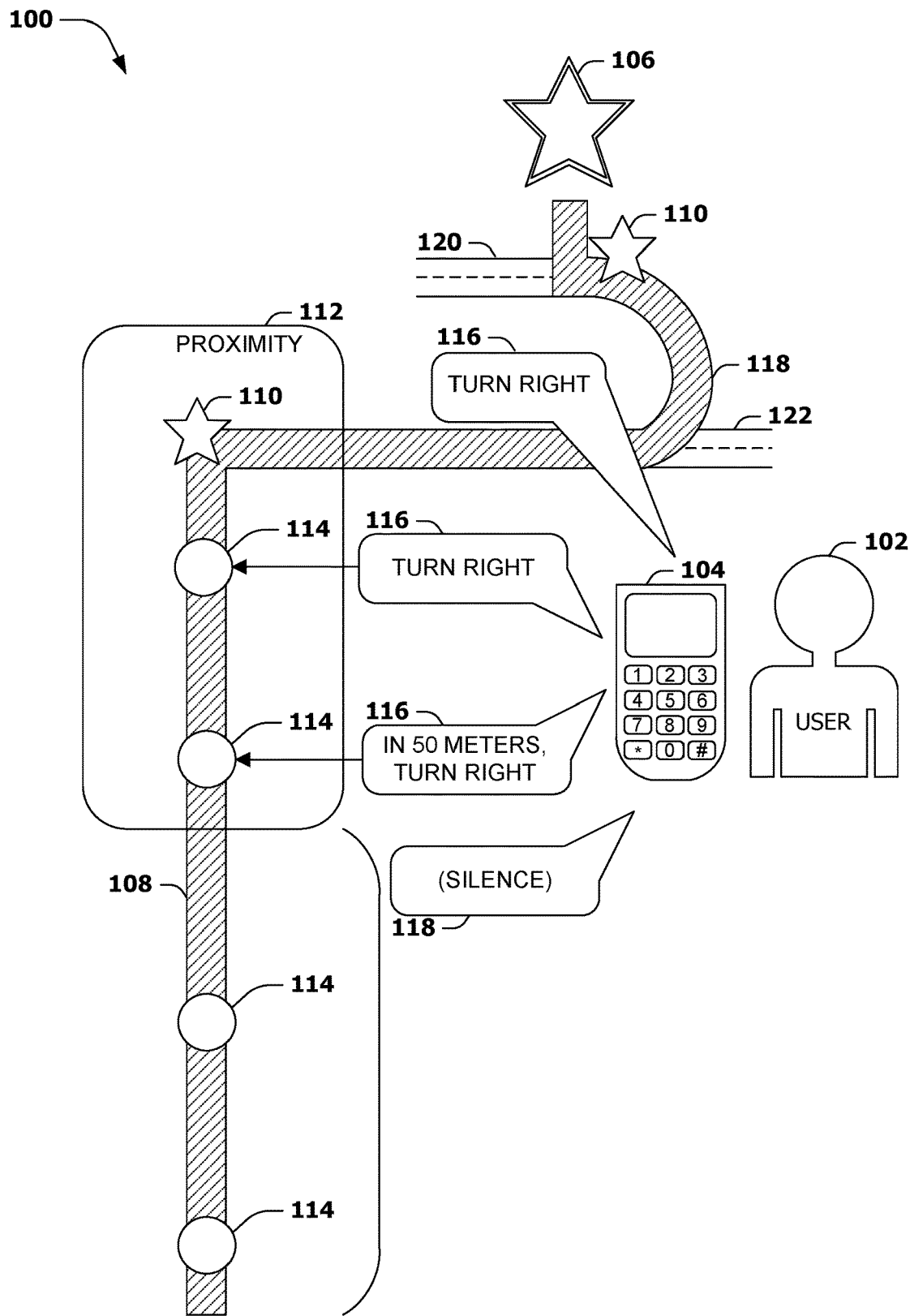
FIG. 1 is an illustration of an example scenario featuring a presentation of navigation audio instructions that assist a user in following a navigation route.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 presents an illustration of an example scenario featuring audio navigation assistance of a user 102 by a device 104. In this example scenario 100, the user 102 is traveling to a destination 106 along a route 108 that comprises a series of navigation points 110, and the user 102 is instructed to follow a particular navigation instruction to maintain the route 108 to the destination 106. The device 14 may monitor a current position 114 of the user 102 (e.g., using a global positioning system (GPS) receiver), and may compare the current position 114 with the location of the next navigation point 110 to determine when to present navigation audio instructions 116 to the user 102. For instance, when the current position 114 of the user 102 is within a proximity 112 of the next navigation point 110, the device 104 may present a navigation audio instruction 116 that informs the user 102 of the proximity 112 and the instruction to be followed there (e.g.: "In 50 meters, turn right"). When the current position 114 of the user 102 indicates an arrival at the next navigation point 110, a second navigation audio instruction 116 is presented that conveys the instruction (e.g.: "Turn right"). By following the navigation audio instructions 116, the user 102 is assisted in following the route 108 to the destination 106.

However, within such scenarios, a number of disadvantages may arise, due to the presentation of navigation audio instructions 116 at respective positions along the route 108.

As a first such example, the presentation of navigation audio instructions 116 may not adequately inform the user along the entire route 108, particularly while no navigation points 110 and/or navigation instructions are relevant. For instance, at one span of the route 108 that is not near a navigation point, the device 104 may present only silence 118 due to the absence of navigation instructions. Such extended silence may lead to confusion by the user 102 as to whether the user 102 is still on the route 108, the distance to the next navigation point 110, and even whether the device 104 is working properly (e.g., whether the device 104 is still operational, running an application that routes the user 102 to the destination 106, and properly rendering audio). Such silence 118 may particularly manifest, e.g., if the user 102 stops along the route 108 due to traffic or to take a break; the device 104 may simply present no information to the user 102 while the current position 114 of the user 102 is stationary and is not crossing within a proximity 112 of a navigation point 110.

As a second such example, the presentation of navigation audio instructions 116 may be inconsistently timed. For example, the device 104 may be configured to present a series of navigation audio instructions 116 at various positions 114 leading up to a navigation point 110, such as an 8-kilometer span of road with navigation audio instructions 116 presented at 2-kilometer, 4-kilometer, and 6-kilometer points. While such occasional notifications may reassure the user 102, the presentation of such navigational audio instructions 116 may be problematic if the speed of the user 102 varies. For example, the user 102 may travel at a consistent 60 kilometers per hour, but may encounter traffic that significant slows travel during the second two-kilometer span. As a result, if the user begins the route at 12:00 pm, the device 104 may present a first navigational audio instruction 116 at 12:02 pm ("turn right in six kilometers"); a second navigational audio instruction 116 at 12:08 pm ("turn right in four kilometers"); and a third navigational audio instruction 116 at 12:10 pm ("turn right in two kilometers"). While properly spaced along the route 108, these navigational audio instructions 116 are chronologically inconsistent, and the user 102 may be left feeling uncertain as to the remaining distance and the fidelity of the user 102 to the route 108.

As a third such example, the presentation of navigation audio instructions 116 may cause confusion by conflating different types of information. For example, a particular navigation point 110 may involve a right-turn navigation instruction for the user 102, but the instruction may occur shortly after a leftward bend 118 in the road upon which the user 102 is traveling. While approaching this navigation point 118, the device 104 may instruct the user 102 to turn right, which may be confusing while the user 102 is preparing to follow the road through the leftward bend 118. In this circumstance, the user 102 may confuse the leftward bend 118 with the right-turn navigation audio instruction 116, and may therefore neglect the navigation audio instruction 116 and follow the road forward 120 after the leftward turn. Alternatively, the user 102 may believe that the leftward bend 118 is a deviation from the route 108, and may instead follow another option that seems to correlate with the "turn right" navigation audio instruction 116, such as a forward continuation 122 instead of the leftward bend 118. Alternatively, the user 102 may simply presume that the device 104 is malfunctioning, and may stop to attend to the device 104 or otherwise correct a perceived error. It may be appreciated that these problems may arise due to the conflation of two distinct types of information: the navigation instruction to be followed at the navigation point 110, and the position of the navigation point 110 itself. That is, as the user 102 approaches the navigation point 110, the heading of the user 102 changes, such that the navigation point first passes the user 102 on the left and then (through the leftward bend 118) pivots to a forward position at the end of the leftward bend 118. Because this information—the indication of where the navigation point 110 occurs relative to the user 102—is conflated with the navigation audio instruction 116 to be followed at that navigation point 110, the information presented by the device 104 may confuse the user 102 and/or cause a deviation from the route 108. These and other disadvantages may arise due to the presentation of navigation audio instructions 116 in accordance with the techniques illustrated in FIG. 1.

B. Presented Techniques

Figure 2:
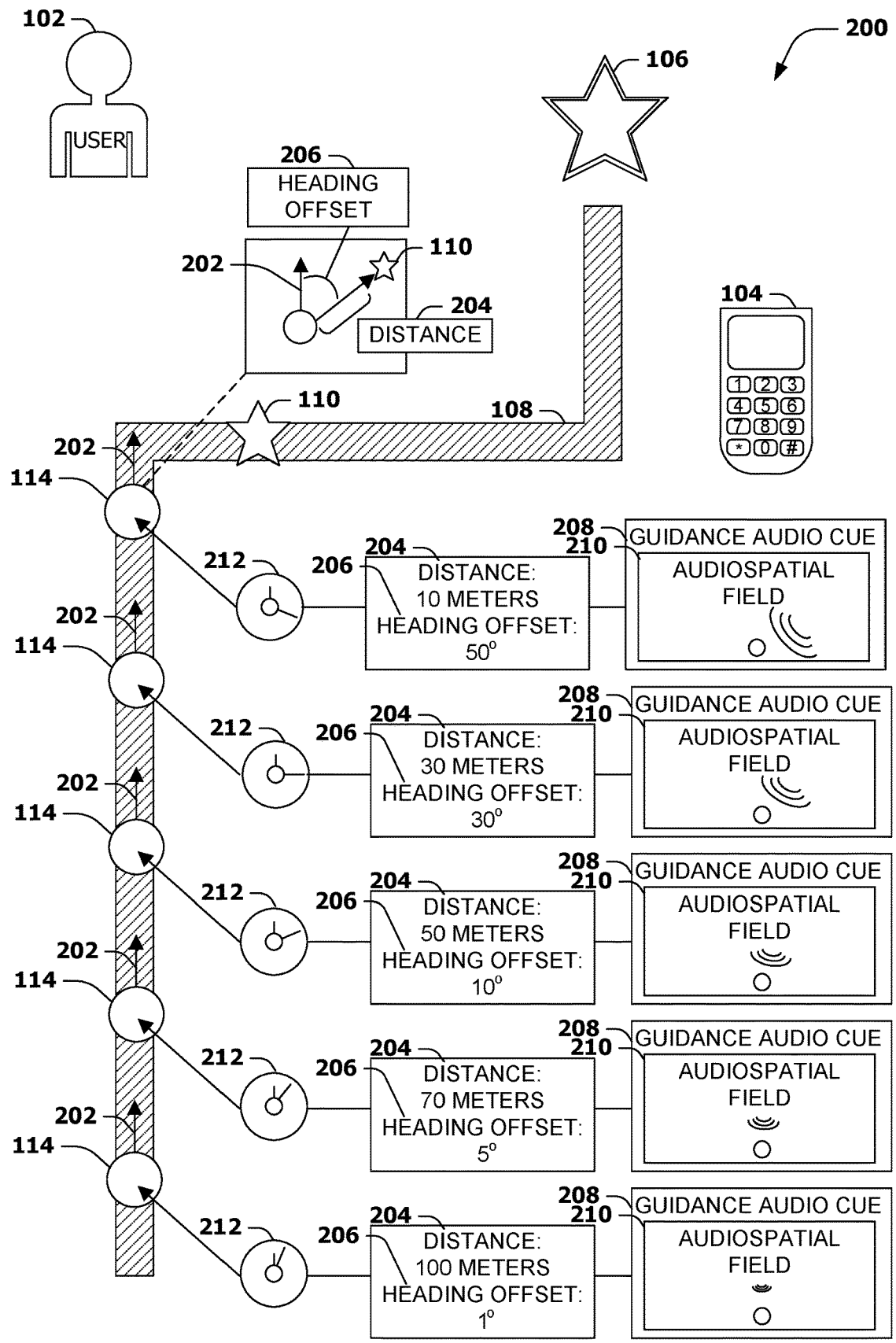
FIG. 2 is an illustration of an example scenario featuring a presentation of guidance audio cues that inform the user of a distance and heading offset to a next navigation point, in accordance with the techniques presented herein.

FIG. 2 is an illustration of an example scenario 200 featuring a presentation of guidance audio cues 208 in accordance with the techniques presented herein.

In this example scenario 200, the user 102 travels a route 108 to a destination 106 with the assistance of the device 104, such as a mobile phone, a tablet, a headset or other form of wearable device, or a vehicle navigation system. The route 108 to the destination 106 may include a set of navigation points 110 where a navigation instruction is to be provided to the user 102. In accordance with the techniques presented herein, the device 104 may periodically 212 detect a current location 114 of the user 102 and a heading 202 of the user 102 (e.g., a compass direction of the direction of travel of the user 102, and/or a compass direction of the road upon which the user 102 is traveling). Using this information, the device 104 may calculate a distance 204 to the next navigation point 110, and a heading offset 206 to the next navigation point 110 (e.g., an angle between the heading 202 of the user 102 and the cardinal direction of the next navigation point 110). In this example scenario, as the user 102 travels along a straight road (with a relatively fixed heading 202), the heading offset 206 increases as the distance 204 to the next navigation point 110 diminishes, due to the approaching navigation point 110 that is positioned toward the right side of the user 102. Further, the device 104 may periodically 212 present, to the user 102, a guidance audio cue 208 that indicates the distance 204 to the next navigation point 110 and the heading offset 206 to the next navigation point 110. In this example scenario 200, the device 104 comprises audio output components that are capable of generating an audiospatial field 210, such as a plurality of speakers arranged within a vehicle of the user 102, a binaural headset, or a simulated three-dimensional audio field. The guidance audio cue 208 is presented to the user 102 that indicates the distance (or, in this example, the proximity) to the next navigation point 110, e.g., by increasing the volume level of the guidance audio cue 208 as the distance to the next navigation point 110 is reduced. Additionally, the guidance audio cue 208 is positioned within the audiospatial field 210 to indicate the heading offset 206. For instance, when the next navigation point 110 is far away and approximately straightforward, the guidance audio cue 208 is presented at an approximately forward-facing location in the audiospatial field 210 (e.g., the guidance audio cue 208 may be played through a binaural speaker set with approximately equal volume through each speaker). However, when the user 102 approaches the next navigation point 110 and the heading offset 206 indicates a steadily increasing angle toward the user's right-hand side, the guidance audio cue 208 is positioned at an increasingly rightward position in the audiospatial field 210 (e.g., a binaural speaker set may present the cue with increasing volume in the right speaker or the right ear of the user 102, and a diminishing volume in the left speaker or left ear of the user 102). In this manner, the guidance audio cues 208 that the device 104 periodically presents to the user 102 may assist the user 102 in understanding the position of the next navigation point 110 relative to the current position 114 of the user 102, in accordance with the techniques presented herein.

C. Technical Effects

Various uses of the techniques presented herein may result in a variety of technical effects.

A first technical effect that may be achievable with the techniques presented herein involves the configuration of a device 104 to provide navigational guidance in a manner that the user 102 may find helpful and conventional navigation assistance. As illustrated in the comparison of FIGS. 1 and 2, the presentation of guidance audio cues 208 may provide a different type of information—i.e., the distance 204 and heading offset 206 to the next navigation point 110 along the route 108, which may supplement the navigation instruction 106 to be followed at the next navigation point 110. In particular, it is noted that conventional navigation techniques often do not provide a heading offset 206 to the next navigation point 110, and that such information may be particularly useful in many scenarios. For example, a route 108 includes a number of options at different headings 202, and a navigation instruction 116 such as "turn right" may be difficult to follow. In such circumstances, presenting a guidance audio cue 208 that indicates a heading offset 206 between the heading 202 of the user 102 and the next navigation point 110 may convey guidance information to the user 102 with greater clarity. In some embodiments, guidance audio cues 208 may be integrated with navigation instructions 116 (e.g., presenting both tones that indicate the distance 204 and heading offset 206 to the next navigation point 110, as well as verbal navigation instructions 116 to be followed upon arrival at the next navigation point 110) to provide more comprehensive navigation guidance to the user 102.

A second technical effect that may achievable with the techniques presented herein involves the adaptation of the device 102 to present guidance audio cues 208 in a comparatively intuitive manner; e.g., positioning an audio tone at a position within an audiospatial field 210 that indicates the heading offset 206, and with a volume level that indicates the distance 204 to the next navigation point 110, may represent a comparatively subtle and readily perceived type of guidance. By contrast, spoken instructions that convey a navigation instruction may require a greater degree of attention and comprehension by the user 102, which may distract the attention of the user 102 from the task of navigation and/or a perception of the user's environment. Such techniques enable the device 104 to convey information to the user 102 as a more intuitive interaction. Some variations, such as the use of tones, may be cognizable irrespective of the language of the user 102 and/or the device 104. Additionally, the use of audio output components to present the guidance audio cues 208 may enable the user 102 to avoid breaking eye contact with the environment, and may therefore provide a significant advantage, e.g., as compared with visual interfaces such as a map.

A third technical effect that may achievable with the techniques presented herein involves the adaptation of the device 102 to reassure the user 102 of the continued compliance with the route 108. As noted in the example scenario 100 of FIG. 1, the presentation of navigation instructions 116 upon arrival at particular positions 114 along a route 108 may become inconsistently timed if the speed of the user 102 varies, e.g., due to traffic, weather, or travel breaks. Protracted delays in the presentation of such navigation instructions 116 may arise if the user 102 stops for an extended period, such as due to severe traffic. Presenting guidance audio cues 208 periodically 212 (e.g., once per minute) may provide a chronologically consistent cue that reassures the user 102 as to the continued adherence to the route 108, independent of the speed of the user 102 during such travel. Many such technical effects may be exhibited by various embodiments of the techniques presented herein.

D. Example Embodiments

Figure 3:
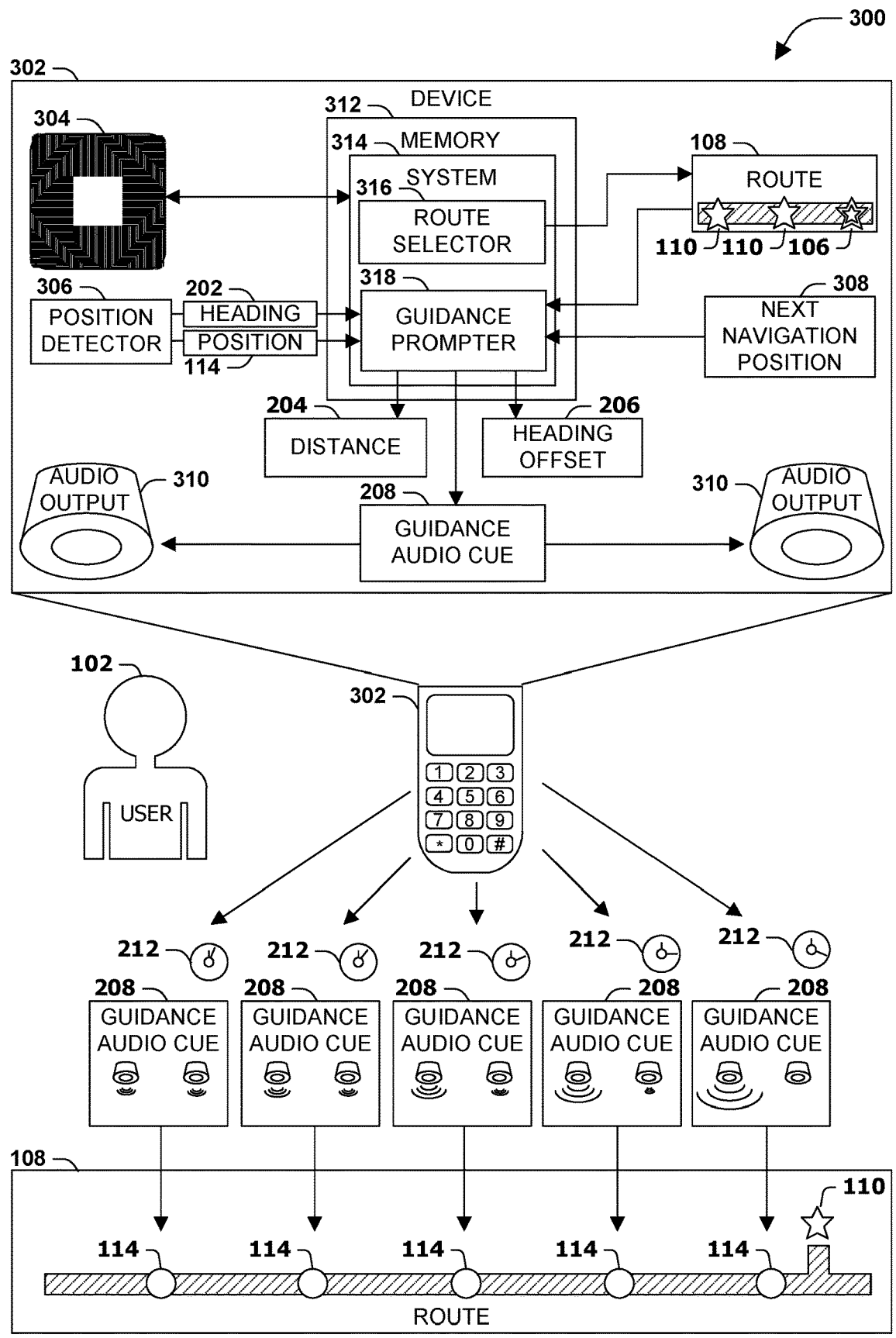
FIG. 3 is an illustration of an example device and/or system that assist a user following a route by using guidance audio cues to inform the user of a distance and heading offset to a next navigation point, in accordance with the techniques presented herein.

FIG. 3 is an illustration of an example scenario 300 featuring some various embodiments of the techniques presented herein.

The example scenario 300 of FIG. 3 involves a device 302 comprising a processor 304 and a memory 312, and a pair of audio outputs 310 (e.g., speakers positioned on the device, and/or relative to the head of the user 102, such as a binaural headset, or a stereo speaker system of a vehicle). The device 302 tracks a route 108 of a user 102 toward a destination 106, and further comprises a position detector 306 (e.g., a global positioning system (GPS) receiver) that detects a current position 114 of the user 102 as well as a heading 202 (e.g., a cardinal direction, such as detected by a physical compass, or inferred by comparing the trajectory of the user 102 between successive current positions 114).

The memory 314 of the device 314 comprises instructions that, when executed by the processor 304, provide an example system 314 that causes the device 302 to operate in accordance with the techniques presented herein. In particular, the example system 314 comprises a route selector 316, which identifies a route 108 to the destination 106, and, along the route 108, a set of navigation points 110. The example system 314 further comprises a guidance prompter 318, which periodically 212 compares the current position 114 of the user 102 and the heading 202 with a next navigation point 308 along the route 108 to determine a distance 204 between the current position 114 of the user 102 and the next navigation point 110, and a heading offset 206 between the heading 202 of the user 102 and the next navigation point 110. The guidance prompter 318 further presents, periodically 212, a guidance audio cue 208 through the audio output 310 that indicates the distance 204 and the heading offset 206 with respect to the next navigation point 110. For example, as the user 102 approaches a next navigation point 110 coming up on the user's left, the device 302 periodically 212 provides guidance audio cues 208 through a pair of stereo audio outputs 310. The guidance audio cues 208 presented by the device 302 indicate the distance 204 as a combined volume of the audio outputs 310: i.e., as the current position 114 of the user 102 approaches the next navigation point 110, the overall volume of the guidance audio cue 208 increases. Additionally, the relative volume presented through each audio output 310 is adjusted to indicate the heading offset 206 of the next navigation point 110; i.e., the volume through the left audio output 310 increases, and the volume through the right audio output 310 decreases, to indicate that the next navigation point 110 is approaching on the left. In this manner, the example device 302 and/or example system 314 enable the presentation of guidance audio cues 208 to assist the user 102 in navigating the route 108 to the destination 106 in accordance with the techniques presented herein.

Figure 4:
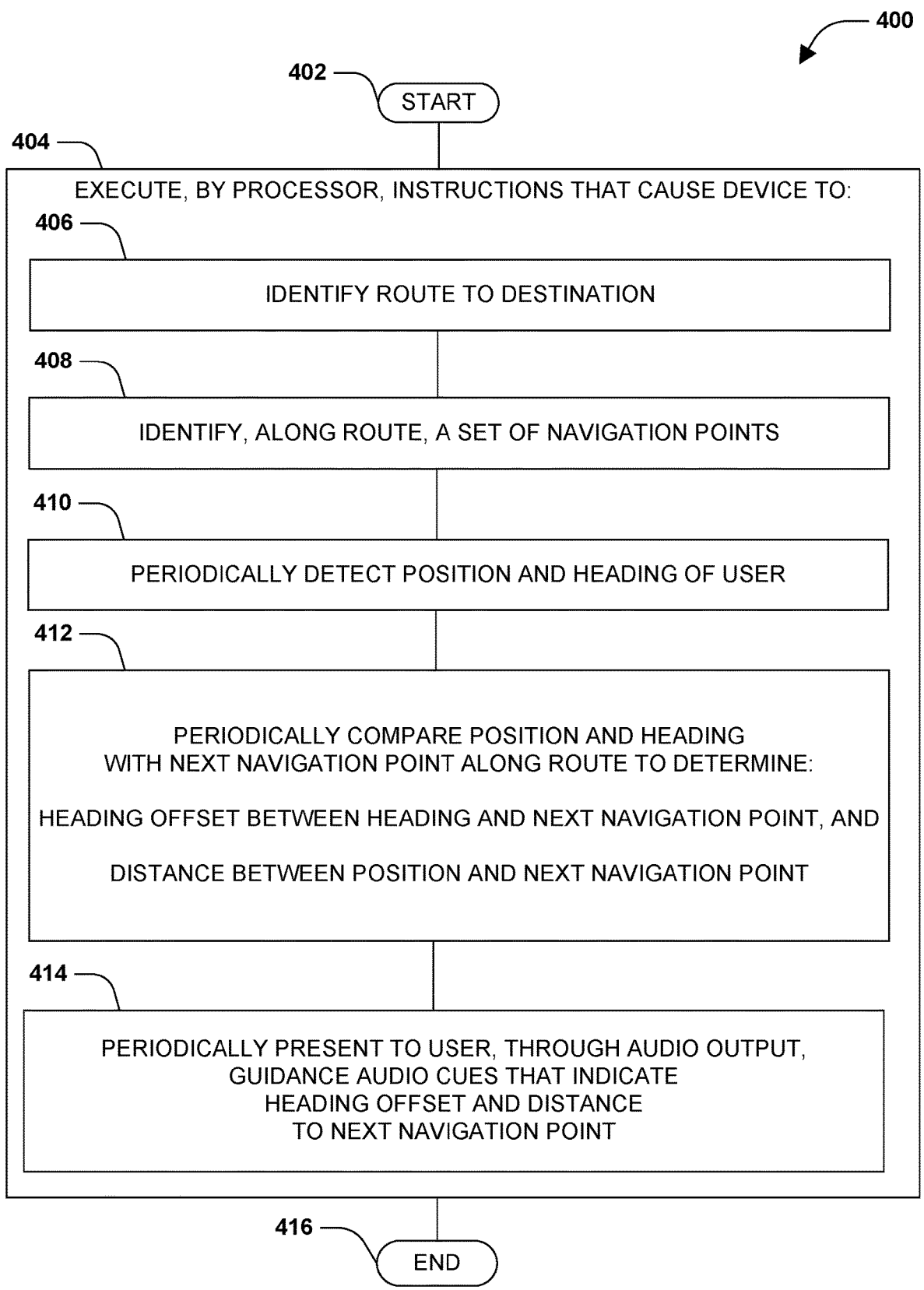
FIG. 4 is an illustration of an example method of assisting a user in following a route through the presentation of guidance audio cues, in accordance with the techniques presented herein.

FIG. 4 is an illustration of an example method 400 of assisting a user 102 navigating to a destination 106, in accordance with the techniques presented herein. The example method 400 involves a device 104 having a processor 304 and an audio output 310, and may be implemented, e.g., as a set of instructions stored in a memory 312 of the device 104, such as firmware, system memory, a hard disk drive, a solid-state storage component, or a magnetic or optical medium, wherein the execution of the instructions by the processor 304 causes the device 102 to perform in accordance with the techniques presented herein.

The example method 400 begins at 402 and involves executing 404 the instructions on the processor 304. In particular, executing the instructions 404 causes the device 104 to identify 406 a route 108 to the destination 106; identify 408, along the route 108, a set of navigation points 110; and periodically 212 detect 410 a position 114 and a heading 202 of the user 102. Executing the instructions 404 also causes the device 104 to periodically 212 compare 412 the position 114 and the heading 202 with a next navigation point 110 along the route 108 to determine a distance 204 between the position and the next navigation point 110, and a heading offset 206 between the heading 202 and the next navigation point 110. Executing the instructions 404 also causes the device 104 to periodically 212 present 414, through the audio output 310, a guidance audio cue 208 that indicates the distance 204 and the heading offset 206 to the next navigation point 110. Having achieved the periodic presentation of guidance audio cues 208, the example method 400 enables the device to assist the user 102 in navigating the route 108 to the destination 106, and so ends at 416.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random dom access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 5:
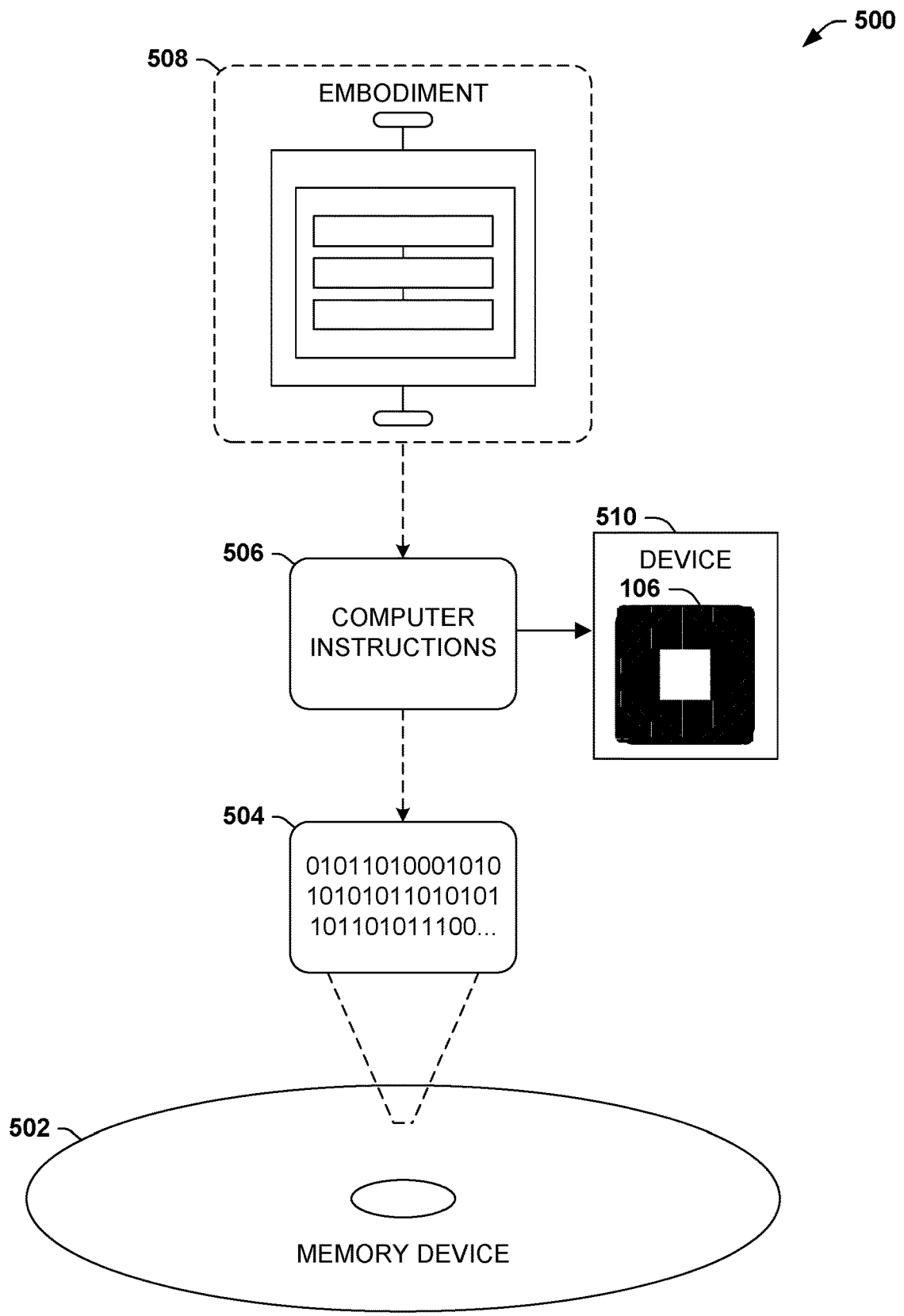
FIG. 5 is an illustration of an example computer-readable memory device that causes a device to assist a user in following a route through the presentation of guidance audio cues, in accordance with the techniques presented herein.

An example computer-readable medium that may be devised in these ways is illustrated in FIG. 5, wherein the implementation 500 comprises a computer-readable memory device 502 (e.g., a CD-R, DVD-R, or a platter of a hard disk drive), on which is encoded computer-readable data 504. This computer-readable data 504 in turn comprises a set of computer instructions 506 that, when executed on a processor 404 of a device 510, cause the device 510 to operate according to the principles set forth herein. For example, the processor-executable instructions 506 may cause a device to assist a user 102 in navigating a route 108 to a destination 106, such as the example device 302 and/or the example system 314 of FIG. 3. As another example, execution of the processor-executable instructions 506 may cause a device 102 to perform a method of assisting a user 102 in navigating a route 108 to a destination 106, such as the example method 400 FIG. 4. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example device 302 of FIG. 3; the example system 314 of FIG. 3; the example method 400 of FIG. 4; and/or the example computer-readable memory device 500 of FIG. 5) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized to produce many types of devices 104. Such devices 104 include mobile devices, such as phones, tablets, and media players, and vehicle navigation systems, such as portable global positioning system (GPS) receivers and/or in-dash head units. Such devices 104 also include wearable devices, such as helmets, eyeglasses, headphones, headsets, earpieces, wristwatches, armbands, necklaces, bracelets, gloves, and footwear. The techniques may also be implemented across a set of devices 104, including devices 104 that are not collocated with the user 102. For example, the techniques presented herein may be implemented on a server that receives information about the current position 114, heading 202, destination 106, and/or route 108 of a user 102, and that provides information to a device 104 of the user 102 to cause the device 104 to assist the user 102 in navigating the route 108 to the destination 106 (e.g., a cloud-based navigation service that generates routes 108 for users, and delivers information and/or instructions to a device 104 for presentation to the user 102).

As a second variation of this first aspect, such devices 104 may utilize a variety of techniques to determine a current position 114 and/or heading 202 of the user 102. As a first such example, a device 104 may comprise a global positioning system (GPS) receiver that detects a geocoordinate indicating the current position 114 of the user 102, and the heading 202 of the user 102 may be determined by comparing successive instances of the current position 114 to identify a direction of travel. As a second such example, a device 104 may comprise an accelerometer that is capable of detecting a physical displacement and/or orientation of the device 104, and the current position 114 and/or heading 202 may be determined therefrom. As a third such example, a device 104 may comprise a compass that identifies a cardinal direction as an orientation of the device 104, and a heading 202 may be identified therefrom. As a fourth such example, a device 104 may comprise a wireless receiver that communicates wirelessly with wireless transmitters, such as cellular and/or radio towers that are located at known positions, and that is capable of triangulating a location based on the signal strengths with respect thereto.

As a third variation of this first aspect, a device 104 may comprise a variety of audio outputs 310 through which guidance audio cues 208 may be presented to a user 102, and particularly in a manner that indicates the heading offset 206, such as by positioning the guidance audio cue 208 within an audiospatial field 210. As a first such example, the device 104 may comprise two or more speakers that individually transmit audio. The volumes of the respective speakers may be adjusted relative to one another to indicate the heading offset 206 of the next navigation point 110 (e.g., playing a tone at higher volume through a left speaker than a right speaker to indicate a leftward heading offset 206 relative to the heading 202 of the user 102), and the overall volume provided by the collection of speakers may be selected to indicate the distance 204 to the next navigation point 110. Such speakers may comprise omnidirectional speakers and/or directional speakers that specifically transmit audio toward the user 102. As a second such example, a headset or head-mounted device may comprise a binaural pair of speakers and/or bone conduction transducers, and the guidance audio cue 208 provided by the audio output positioned near the left and right ears of the user 102 may be adjusted to indicate the distance 204 and/or heading offset 206 to the next navigation point 110. As a third such example, three-dimensional audio simulation techniques may be utilized by binaural output devices to position guidance audio cues 208 within a three-dimensional audiospatial field 210. Many such variations may be included in embodiments of the techniques presented herein.

E2. Guidance Audio Cues

A second aspect that may vary among embodiments of the techniques presented herein involves the types of guidance audio cues 208 that are presented to the user 102 to indicate the distance 204 and/or heading offset 206 of the next navigation point 110 along the route 108. The variations of such guidance audio cues 208 include many properties of the guidance audio cues 208 may be selected and varied to indicate the distance 204 and/or heading offset 206 of the next navigation point 110 along the route 108.

As a first variation of this second aspect, the guidance audio cues 208 may be presented as many types of audio, such as speech, nonverbal sound effects, music, and individual tones or chords. The guidance audio cues 208 may also be supplemented with a variety of non-audio signals, such as visual signals presented by a display, and/or haptic signals provided by a wearable device.

As a second variation of this second aspect, the audio output 310 may be capable of presenting audio to the user 102 within an audiospatial field 210, where a first audio object is presented at a first audiospatial position within the audiospatial field, and a second audio object is presented at a second audiospatial position that is different from the first audiospatial field. The techniques presented herein may utilize such capabilities to present respective guidance audio cues 208 to the user 102 by selecting an audiospatial position for the guidance audio cue 208 that indicates at least one of the distance 204 and the heading offset 206, and presenting the guidance audio cue 208 through the audio output 310 at the audiospatial position within the audiospatial field 210.

As a third variation of this second aspect, a variety of audio properties of the guidance audio cues 208 may be selected to convey the distance 204 and/or the heading offset 206 between the current position 114 and/or heading 202 of the user 102 and the next navigation point 110 along the route 108. Such audio properties include, e.g., the tone of the guidance audio cue 208 (e.g., higher tones may indicate a proximity to the next navigation point 110); a sweep of the guidance audio cue 208 (e.g., a small upward or downward frequency sweep may indicate significant distance, and a large upward or downward frequency sweep may indicate proximity); a volume of the guidance audio cue 208 (e.g., the guidance audio cue 208 may increase in volume with increasing proximity); and/or a periodicity of the guidance audio cue 208 (e.g., the periodic 212 presentation of the guidance audio cues 208 may increase in frequency with greater proximity to the next navigation point 110).

As a fourth variation of this second aspect, various audio properties of the guidance audio cues 208 may selected to indicate additional information about the next navigation point 110, supplemental of the distance 204 and/or heading offset 206. As a first such example, the audio properties may indicate a velocity with which the next navigation point 110 is approaching. For instance, a device 104 utilizing such techniques may compare the current position 114 of the user 102 and the heading 202 with the next navigation point 110 to determine a velocity with which the user 102 is approaching the next navigation point 110; may select, for the guidance audio cue 208, an audio property that indicates the velocity with which the user 102 is approaching the next navigation point 110; and present the guidance audio cue 208 through the audio output 310 with the audio property indicating the velocity. As a second such example, the next navigation point 110 may further comprises a navigation instruction of a navigation instruction type along the route 108 (e.g., a turn, a stop, a change in travel speed, or a transition in travel type, such as changing from a pedestrian context to a vehicular context). Various audio properties of the guidance audio cues 208 may be associated with different navigation instruction types, and presenting the guidance audio cue 208 may further comprise selecting an audio property that indicates the navigation instruction type of the navigation instruction represented by the next navigation point, and presenting the guidance audio cue 208 through the audio output 310 with the audio property.

Figure 6:
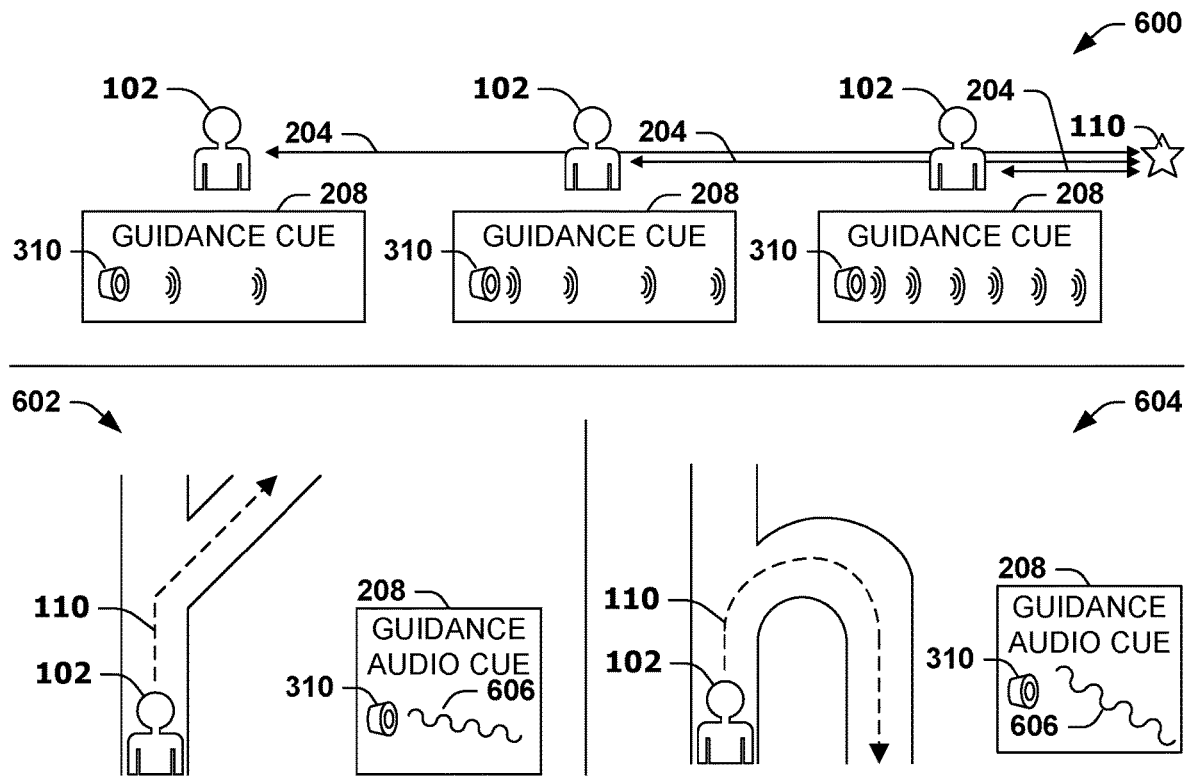
FIG. 6 is an illustration of an example scenario featuring techniques for varying a guidance audio cue to indicate various navigation properties to a user following a route, in accordance with the techniques presented herein.

FIG. 6 is an illustration of some example scenarios in which audio properties of the guidance audio cues 208 are varied to indicate various types of guidance information. In a first such scenario 600, the frequency of the guidance audio cues 208 increases proportionally with a proximity of the user 102 to the next navigation point 110; e.g., as the distance 204 between the user 102 and the next navigation point 110 diminishes, the guidance audio cues 208 are presented by the audio output 310 with increasing frequency. In a second such scenario 604, the sweep 606 of a guidance audio cue 208 is adapted to convey variations in the type of navigation instruction to be presented to the user 102 at the next navigation point 110. For example, if the next navigation point 110 comprises a gradual turn, the sweep 606 of the guidance audio cue 208 may be gradual (e.g., a small or gradual range of pitch); and if the next navigation point 110 comprises a sharp turn, the sweep 606 of the guidance audio cue 208 may be steep (e.g., a large or swift range of pitch).

As a fifth variation of this second aspect, the presentation of guidance audio cues 208 may be adapted in many ways based on the circumstances of the user 102. As a first such example, the device 102 may periodically compare the current position 114 and the heading 202 of the user 102 with a next navigation point 110 even while the current position 114 of the user 102 is stationary, and may continue to present guidance audio cues 208 to the user 102 even while the current position 114 of the user 102 remains stationary.

Figure 7:
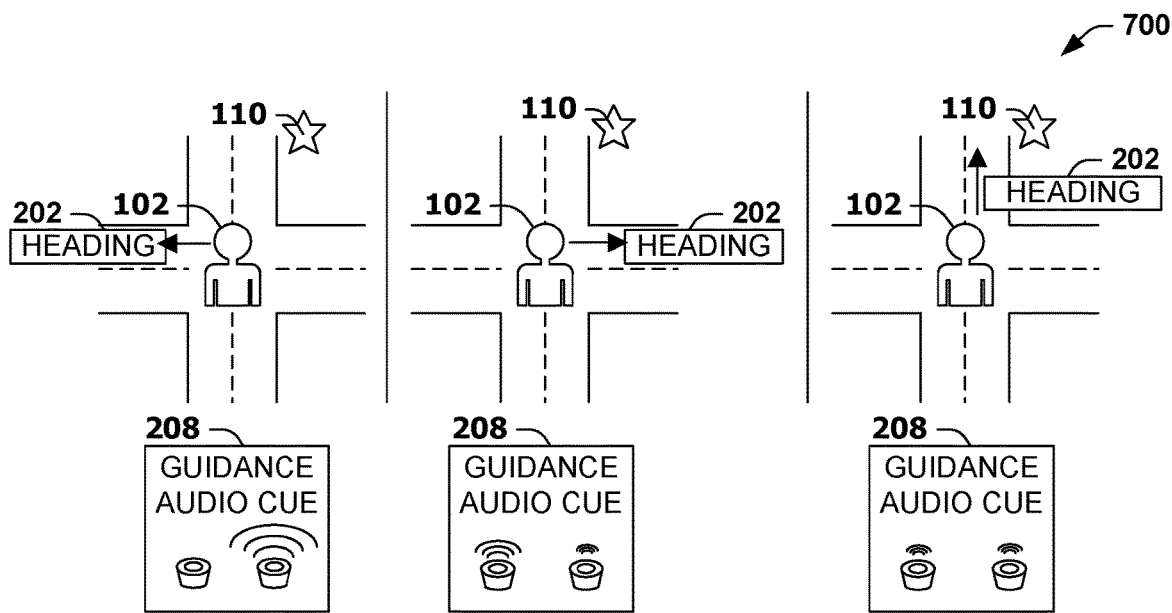
FIG. 7 is an illustration of an example scenario featuring a presentation of guidance audio cues to inform a user of a heading offset between a current heading of the user and a next navigation point, in accordance with the techniques presented herein.

FIG. 7 is an illustration of an example scenario 700 featuring a continued presentation of guidance audio cues 208 while the current position 114 of the user 102 remains stationary. In this example scenario 700, the user 102 arrives at an intersection, but is uncertain of the heading offset 206 toward the next navigation point 110. Even while the user 102 remains stationary, the user 102 may rotate in place, such that the device 104 detects changes in the heading 202. In this context, the presentation of guidance audio cues 208 may serve to inform the user 102 of the proper heading 202 toward the next navigation point. For example, while the user 102 rotates, the audiospatial component of the guidance audio cues 208 may change to indicate the heading offset 206. If the user 102 is facing too far to the left, the device 104 presents a guidance audio cue 208 that is positioned toward the right. If the user 102 is facing too far to the right, the device 104 presents a guidance audio cue 208 that is positioned toward the left. If the user 102 is facing the correct direction, the device 104 presents a guidance audio cue 208 that is balanced, and therefore indicates a zero or straight-ahead heading offset 206. If the user 102 faces the opposite direction, the device 104 may refrain from presenting any guidance audio cues 208 to indicate divergence from the route 108 at this heading 308. In this manner, the guidance audio cues 208 may assist the user 102 in determining the heading 308 toward the next navigation point 110 even while the current position 112 user 102 is stationary, in accordance with the techniques presented herein.

As a sixth variation of this second aspect, many techniques may be utilized to adapt the presentation of the guidance audio cues 208 to the performance of the device 104. As a first such example, the volume of the guidance audio cues 208 may be adapted based on the ambient volume level, e.g., raising the volume level of the guidance audio cues 208 to overcome background noise. As a second such example, the presentation of guidance audio cues 208 may pause while the device 104 is engaging in other events, such as a phone call, or while the user 102 participates in other activities, such as an extended stop for fuel or food. As a third such example, where the audio output 310 of the device 104 presents a primary audio stream to the user 102, the periodic presentation of the guidance audio cues 208 may be adapted to integrate with the primary audio stream presented by the audio output 310. Such integration may involve, e.g., adding the guidance audio cues 208 with the primary audio stream, and/or pausing the primary audio stream to present the guidance audio cues 208 on a periodic basis.

Figure 8:
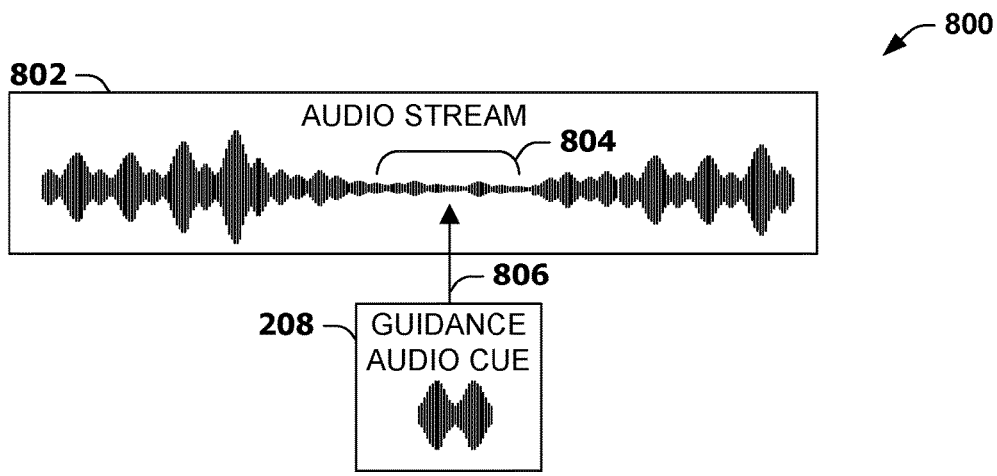
FIG. 8 is an illustration of an example scenario featuring an insertion of guidance audio cues into an audio stream, in accordance with the techniques presented herein.

FIG. 8 is an illustration of an example scenario 800 featuring a third example of this sixth variation of this second aspect, involving the integration of guidance audio cues 208 with other audio presented by the device 104. In this example scenario 800, the device 104 presents a primary audio stream 802 such as recorded music or an audio book, and also endeavors to provide guidance audio cues 208 without interfering with the primary audio stream 802. The device 104 may examine the primary audio stream 802 for a low-volume interval 804 that is of at least the length of the guidance audio cue 208, and may insert 806 the guidance cue into the primary audio stream 802 for presentation to the user during the low-volume interval 804. The evaluation of the primary audio stream 802 may involve, e.g., looking forward through a pre-recorded stream that is available for examination (optionally within a window during which the guidance audio cue 208 is to be presented, e.g., any time within a 30-second window), and/or monitoring a live primary audio stream 802 to identify a low-volume interval 804 for at least a threshold duration (e.g., a lull in a conversation of at least two seconds, at which point the insertion of the guidance audio cue 208 is less likely to interrupt conversation and is more likely to be perceived). In this manner, the guidance audio cues 208 may be integrated with the primary audio stream 802 in a manner that the user 102 is more likely to perceive as a positive facilitation and less likely to interrupt the primary audio stream 802 of the device 104, in accordance with the techniques presented herein.

As a seventh variation of this second aspect, the device 104 may adapt the presentation of guidance audio cues 208 based upon the circumstances in which the device 104 is presenting the guidance audio cues 208 to the user 102. As a first such example, the device 104 may present guidance audio cues 208 less frequently, and/or of a more subtle variety (e.g., at a lower volume, or as a tone instead of a verbal instruction), if the user 102 is in a more familiar environment, such as near home or in a familiar home city, than if the user 102 is in a less familiar environment, such as in a remote location or an unfamiliar city. As a second such example, the device 104 may present guidance audio cues 208 more frequently, and/or of a more overt variety (e.g., at a higher volume, or as explicit verbal instructions rather than tones), if the user 102 appears to be having difficulty following guidance audio cues 208 than if the user 102 is correctly following guidance audio cues 208. As a third such example, the device 104 may present guidance audio cues 208 more frequently or more explicitly if the route 108 is complex, e.g., if the route 108 involves a number of navigation audio instructions 116 within a relatively short time frame, than if the route 108 is comparatively simple, e.g., a few turns that are spaced apart at a comfortable interval. As a fourth such example, the device 104 may present guidance audio cues 208 more frequently or more explicitly if the destination 106 and/or route 108 are urgent, e.g., if the destination 106 is an appointment at a fixed time such that divergence from the route 108 may be problematic, than if the destination 106 and/or route 108 are relaxed, e.g., returning home without a constrained time frame. Many such variations may be devised in the presentation of guidance audio cues 208 in accordance with the techniques presented herein.

E3. Presentation of Supplemental Information

A third aspect that may vary among embodiments of the techniques presented herein involves the extension of guidance audio cues 208 to present supplementation information to the user 102. While the variations presented heretofore have generally related to the next navigation point 110, the presentation of guidance audio cues 208 may also convey other information that may be of interest to the user.

As a first variation of this third aspect, a device 104 may present supplemental information about the route 108, such as road hazards or weather conditions to be avoided, the development of traffic congestion or construction, the availability of alternative routes, and an estimated time of arrival at the destination 106. The device 104 may also present information that assists the user 102 that may enable the user 102 to follow the route 108.

As a second variation of this third aspect, the device 104 may periodically detecting a passing of the position of the user beyond the next navigation point 110, and may present to the user 102 a passing warning that indicates that the current position 112 of the user 102 has passed beyond the next navigation point 110.

As a fourth variation of this third aspect, the route selector 316 of a device 104 may further detect a divergence point to be avoided along the route 108 (e.g., an incorrect direction that the user 102 may inadvertently take while attempting to maintain the route 108 and/or reach the next navigation point 110). The divergence point may be detected, e.g., by evaluating a past travel route of the user 102, and determining that the user 102 has previously taken the divergence point to be avoided (e.g., the user 102 has previously made a particular mistake in following the route 108 to the destination 106; and/or the user 102 has previously taken a different direction at a particular intersection to reach a different destination 106, while the route 108 to the current destination 106 involves a different direction to be taken at the divergence point). Alternatively or additionally, the divergence point may be determined according to a past travel route of other users 102, e.g., determining that other users traveling the route 108 have incorrectly taken the divergence point to be avoided. The device 104 may therefore present to the user 102 a divergence warning that cautions the user 102 of the divergence point to be avoided along the route 108.

Figure 9:
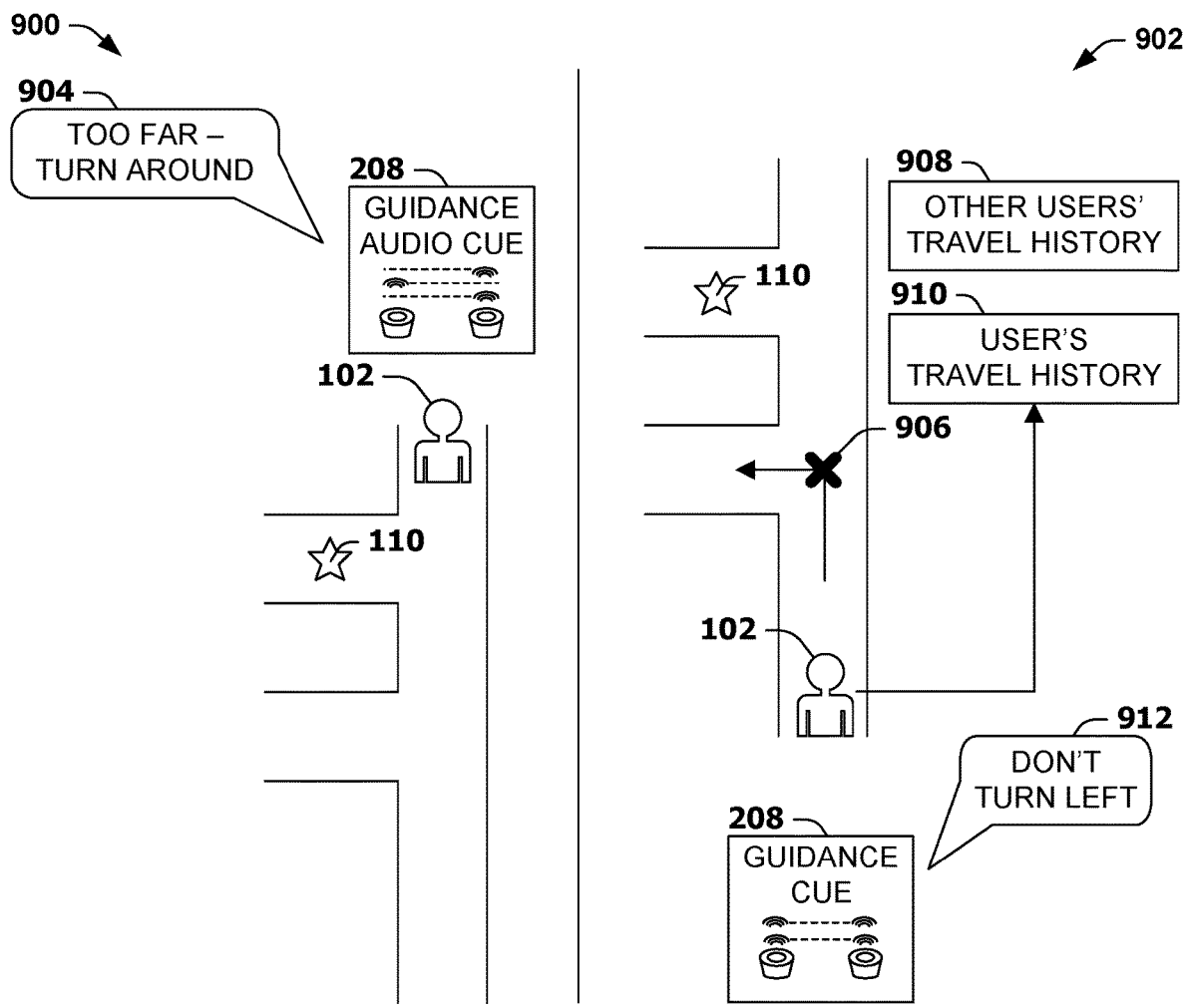
FIG. 9 is an illustration of an example scenario featuring supplemental guidance audio cues that may be presented to a user to assist further with the guidance of the navigation of the user in following a route, in accordance with the techniques presented herein.

FIG. 9 is an illustration of example scenarios featuring some examples of such variations of the third aspect of the techniques presented herein. In a first example scenario 900, the user 102 is following a route 108 toward a next navigation point 110, but has failed to follow a navigation instruction at the next navigation point 110. The device 104 may present a guidance audio cue 208 that conveys the error to the user 102, e.g., a left-right-left tone that signals a "turn around" navigation instruction 904 (optionally accompanied by a verbal instruction). In a second example scenario 902, the user 102 is following a route 108 to a next navigation point 110, but is approaching a particular divergence point 906 that raises a possibility of an incorrect navigation (e.g., based on other users' travel history 908 or the user's own travel history 910), such as a first left turn that closely precedes a second left turn that the user 102 is to follow, where the first left turn incorrectly leads the user 102 away from the destination 106. The device 104 may present a guidance audio cue 208 that cautions the user 102 about the divergence point 906, e.g., presenting a "straight ahead" type of guidance audio cue 208 that serves as a "don't turn left" navigation instruction 912. In this manner, the presentation of guidance audio cues 208 may be adapted to promote the understanding of the user 102 as to the position of the next navigation point 110 in accordance with the techniques presented herein.

E4. Location of Interest Guidance Audio Cues

A fourth aspect that may vary among embodiments of the techniques presented herein involves the presentation of guidance audio cues 208 may be supplemented with location of interest cues that provide information about locations of interest near the route 208. In such scenarios, a device 104 may identify, within a proximity of the route 108, a location of interest. Similar to evaluating the current position 114 and heading 202 of the user 102, the device may periodically 212 compare the current position 114 and the heading 202 of the user 102 with the location of interest to determine a second distance between the current position 114 and the location of interest, and a second heading offset between the heading 202 and the location of interest. The device 104 may then present to the user 102 through the audio output 310, a location of interest guidance audio cue that indicates the second heading offset and the second distance to the location of interest.

As a first variation of this fourth aspect, many techniques may be used to identify a location of interest near the route 108 of the user 102. As a first such example, the device 104 may monitor a user context of the user 102, such as the last time that the user 102 stopped for food and/or fuel or took a travel break, and may identify the location of interest according to the user context of the user 102. As a second such example, the device 104 may receive the location of interest from a recommendation service (e.g., a travel service that identifies locations that may be of interest to the user 102), and/or from second user (e.g., a recommendation by a member of the user's social network to visit a particular location).

As a second variation of this fourth aspect, the device 104 may supplement the presentation of guidance audio cues 208 pertaining to the next navigation point 110 with locations of interest guidance audio cues that identify the locations of interest near the route 108. In some scenarios, the location of interest may further comprise a location of interest type (e.g., a restaurant, a café, a fuel depot, or a visitors' center for a region). The presentation of the location of interest guidance audio cue may involve selecting an audio property that indicates the location of interest type of the location of interest, and presenting the location of interest guidance audio cue through the audio output 320 with the audio property. Additionally, the device 104 may detect a selection from the user 102 of the location of interest (e.g., a verbal indication or device interaction connoting the user's interest in the location of interest, or a divergence of the user's travel toward the location of interest), and may therefore presenting, through the audio output 320, additional information about the location of interest.

Figure 10:
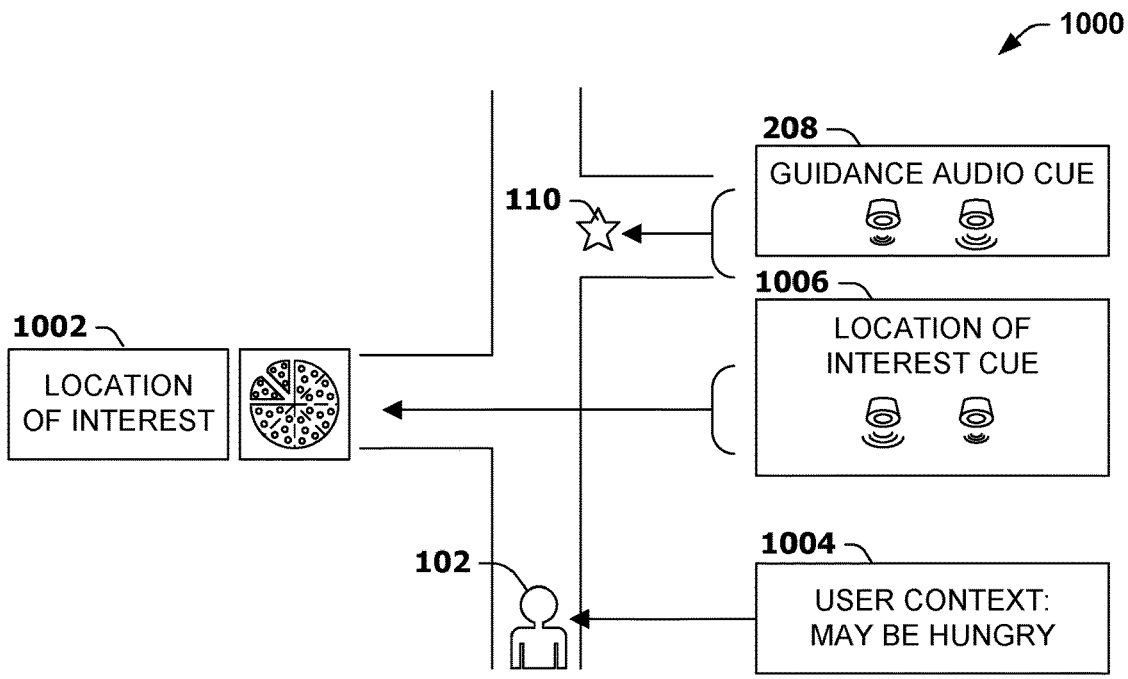
FIG. 10 is an illustration of an example scenario featuring techniques for supplementing guidance audio cues with location of interest audio cues that indicate locations that may be of interest to the user, in accordance with the techniques presented herein.

FIG. 10 is an illustration of an example scenario 1000 featuring several such variations of this third aspect. In this example scenario 1000, while the user 102 is traveling toward the next navigation point 110 and is receiving guidance audio cues 208, the device 104 may identify a location of interest 1002 based on a user context 1004 of the user 102, such as a restaurant identified based upon the user's likely level of hunger. The device 104 may therefore supplement the guidance audio cue 208 with a location of interest guidance audio cue 1006 that identifies, for the user 102, the option of visiting the location of interest 102.

As a third variation of this fourth aspect, the device 104 may be configured to avoid oversaturating the user 102 with supplemental information while presenting location of interest guidance audio cues to the user 102. For example, the device 104 may monitor an information density of information presented to the user 102 through the audio output 320, and may present the location of interest guidance audio cues 1006 to the user 102 only while the information density of the information presented to the user 102 through the audio output 320 remains below an information density threshold. In this manner, the device 104 may limit the location of interest guidance audio cues 1006 to maximum number of recommendations within a particular time period. Additionally, the locations of interest 1002 that are selected for presentation to the user 102 may be adapted according to such techniques. For example, the selected locations of interest may be prioritized (e.g., choosing to present less preferable restaurants only if none of the user's more preferable restaurants are near the route 108, or choosing to present a fuel location of interest guidance audio cue 1006 instead of a food location of interest guidance audio cue 1006 if the urgency of refueling exceeds the urgency of the user's hunger level).

Figure 11:
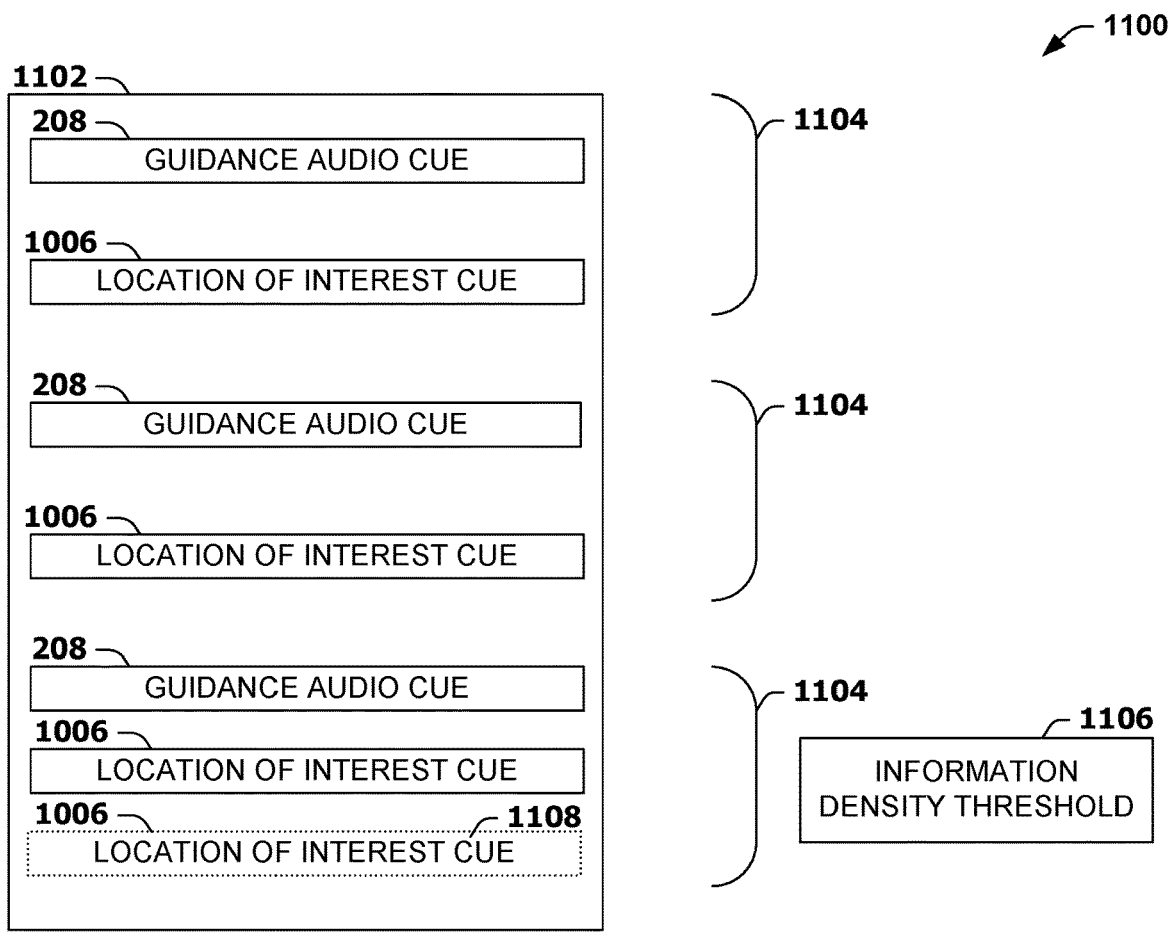
FIG. 11 is an illustration of an example scenario featuring a technique for selecting location of interest audio cues for supplemental presentation with guidance audio cues, in accordance with the techniques presented herein.

FIG. 11 is an illustration of an example scenario 1100 featuring the presentation of location of interest audio guidance cues 1006. In this example scenario 1100, the device 104 presents an audio stream 1102 of guidance audio cues 208, interleaved with location of interest guidance audio cues 1006. The device also tracks the number of guidance audio cues presented within respective units of time 1104 (e.g., within each 60-second period). If the insertion of a location of interest audio guidance cues 1006 causes the audio stream 1102 to exceed an information density threshold 1106, the device withholds 1108 the location of interest audio guidance cue 1006. In this manner, the device adapts the supplementation of the audio stream 1102 with location of interest audio guidance cues 1006 to avoid oversaturating the user 102 with supplemental information. Many such techniques may be utilized to adapt the presentation of guidance audio cues by the device 104 to the user 102 in accordance with the techniques presented herein.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system for assisting a user navigating to a destination on a device having a processor, an audio output, and a position detector that detects a position of the user and a heading of the user, the system comprising:
a memory storing instructions that, when executed by the processor, provide:
a route selector that identifies a route to the destination and identifies, along the route, a set of navigation points; and
an audio prompter that:
periodically compares the position and the heading of the user with a next navigation point along the route to determine:
a heading offset between the heading of the user and the next navigation point; and
a distance between the position of the user and the next navigation point, wherein the heading offset increases when the distance decreases; and
periodically presents, through the audio output, a guidance audio cue that indicates the heading offset and the distance, the guidance audio cue presented at least while the position of the user is stationary.

2. The system of claim 1, wherein the audio output presents audio to the user within an audiospatial field, where a first audio object is presented at a first audiospatial position within the audiospatial field, and a second audio object is presented at a second audiospatial position that is different from the first audiospatial field, and wherein presenting the guidance audio cue further comprises:
selecting an audiospatial position for the guidance audio cue that indicates at least one of the heading offset or the distance; and
presenting the guidance audio cue through the audio output at the audiospatial position within the audiospatial.

3. The system of claim 1, wherein periodically presenting the guidance audio cue that indicates the distance further comprises:

selecting, for the guidance audio cue, an audio property that indicates the distance, wherein the audio property comprises:
a tone of the guidance audio cue;
a sweep of the guidance audio cue;
a volume of the guidance audio cue; or
a periodicity of the guidance audio cue; and
presenting the guidance audio cue through the audio output with the audio property.

4. The system of claim 1, wherein periodically presenting the guidance audio cue that indicates the heading offset further comprises:
selecting, for the guidance audio cue, an audio property that connotes the heading offset; and
presenting the guidance audio cue through the audio output with the audio property.

5. The system of claim 1, wherein periodically comparing the position of the user and the heading of the user with the next navigation point further comprises periodically comparing the position of the user and the heading of the user with the next navigation point to determine a velocity with which the user is approaching the next navigation point, and wherein periodically presenting the guidance audio cue that indicates the distance further comprises:
selecting, for the guidance audio cue, an audio property that indicates the velocity with which the user is approaching the next navigation point; and
presenting the guidance audio cue through the audio output with the audio property.

6. The system of claim 1, wherein the next navigation point further comprises a navigation instruction of a navigation instruction type along the route, and wherein presenting the guidance audio cue further comprises:
selecting, for the guidance audio cue, an audio property that indicates the navigation instruction type of the navigation instruction represented by the next navigation point; and
presenting the guidance audio cue through the audio output with the audio property.

7. The system of claim 1, wherein the audio prompter compares the position of the user and the heading of the user with the next navigation point along the route at least while the position of the user is stationary.

8. A system for assisting a user navigating to a destination on a device having a processor, an audio output, and a position detector that detects a position of the user and a heading of the user, the system comprising:
a memory storing instructions that, when executed by the processor, provide:
a route selector that identifies a route to the destination and identifies, along the route, a set of navigation points; and
an audio prompter that:
periodically compares the position of the user and the heading of the user with a next navigation point along the route to determine:
a heading offset between the heading of the user and the next navigation point; and
a distance between the position of the user and the next navigation point, wherein the heading offset increases when the distance decreases;
periodically presents, through the audio output, a guidance audio cue that indicates the heading offset and the distance to the next navigation point, wherein presenting the guidance audio cue that indicates the distance further comprises:

selecting, for the guidance audio cue, an audio property that indicates the distance, wherein the audio property comprises:
- a tone of the guidance audio cue;
- a sweep of the guidance audio cue;
- a volume of the guidance audio cue; or
- a periodicity of the guidance audio cue; and presenting the audio property that indicates the distance through the audio output with the audio property.

9. The system of claim 8, wherein the audio output presents audio to the user within an audiospatial field, where a first audio object is presented at a first audiospatial position within the audiospatial field, and a second audio object is presented at a second audiospatial position that is different from the first audiospatial field, and wherein presenting the guidance audio cue further comprises:
- selecting an audiospatial position for the guidance audio cue that indicates at least one of the heading offset or the distance; and
- presenting the guidance audio cue through the audio output at the audiospatial position within the audiospatial field.

10. The system of claim 8, wherein periodically comparing the position of the user and the heading of the user further comprises: periodically comparing the position of the user and the heading of the user with the next navigation point at least while the position of the user is stationary, and wherein periodically presenting the guidance audio cue through the audio output further comprises presenting the guidance audio cue to the user at least while the position of the user is stationary.

11. The system of claim 8, wherein periodically presenting the guidance audio cue that indicates the heading offset further comprises:
- selecting, for the guidance audio cue, an audio property that connotes the heading offset; and
- presenting the guidance audio cue through the audio output with the audio property.

12. The system of claim 8, wherein periodically comparing the position of the user and the heading of the user with the next navigation point further comprises: periodically comparing the position of the user and the heading of the user with the next navigation point to determine a velocity with which the user is approaching the next navigation point, and wherein periodically presenting the guidance audio cue that indicates the distance further comprises:
- selecting, for the guidance audio cue, an audio property that indicates the velocity with which the user is approaching the next navigation point; and
- presenting the guidance audio cue through the audio output with the audio property.

13. The system of claim 8, wherein the next navigation point further comprises a navigation instruction of a navigation instruction type along the route, and wherein periodically presenting the guidance audio cue further comprises:
- selecting, for the guidance audio cue, an audio property that indicates the navigation instruction type of the navigation instruction represented by the next navigation point; and
- presenting the guidance audio cue through the audio output with the audio property.

14. A system for assisting a user navigating to a destination on a device having a processor, an audio output, and a position detector that detects a position of the user and a heading of the user, the system comprising:

a memory storing instructions that, when executed by the processor, provide:
- a route selector that identifies a route to the destination and identifies, along the route, a set of navigation points; and
- an audio prompter that:
  - periodically compares the position of the user and the heading of the user with a next navigation point along the route to determine;
    - a heading offset between the heading of the user and the next navigation point;
    - a distance between the position of the user and the next navigation point, wherein the heading offset increases when the distance decreases; and
    - a velocity with which the user is approaching the next navigation point; and
  - periodically presents, through the audio output, a guidance audio cue that indicates the heading offset between the heading of the user and the next navigation point, the distance between the position of the user and the next navigation point, and the velocity with which the user is approaching the next navigation point.

15. The system of claim 14, wherein the audio output presents audio to the user within an audiospatial field, where a first audio object is presented at a first audiospatial position within the audiospatial field, and a second audio object is presented at a second audiospatial position that is different from the first audiospatial field, and wherein periodically presenting the guidance audio cue further comprises:
- selecting an audiospatial position for the guidance audio cue that indicates at least one of the heading offset or the distance; and
- presenting the guidance audio cue through the audio output at the audiospatial position within the audiospatial field.

16. The system of claim 14, wherein periodically comparing the position of the user and the heading of the user further comprises periodically comparing the position of the user and the heading of the user with the next navigation point at least while the position of the user is stationary, and wherein periodically presenting the guidance audio cue through the audio output further comprises presenting the guidance audio cue at least while the position of the user is stationary.

17. The system of claim 14, wherein periodically presenting the guidance audio cue that indicates the distance between the position and the next navigation point further comprises:
- selecting, for the guidance audio cue, an audio property that indicates the distance between the position and the next navigation point, wherein the audio property comprises:
  - a tone of the guidance audio cue;
  - a sweep of the guidance audio cue;
  - a volume of the guidance audio cue; or
  - a periodicity of the guidance audio cue; and
- presenting the guidance audio cue through the audio output with the audio property.

18. The system of claim 14, wherein periodically presenting the guidance audio cue that indicates the heading offset further comprises:
- selecting, for the guidance audio cue, an audio property that connotes the heading offset; and
- presenting the guidance audio cue through the audio output with the audio property.

19. The system of claim 14, wherein the next navigation point further comprises a navigation instruction of a navigation instruction type along the route, and wherein periodically presenting the guidance audio cue further comprises:
- selecting, for the guidance audio cue, an audio property that indicates the navigation instruction type of the navigation instruction represented by the next navigation point; and
- presenting the guidance audio cue through the audio output with the audio property.

\* \* \* \* \*